United States Patent
Wang et al.

(10) Patent No.: US 12,106,228 B2
(45) Date of Patent: Oct. 1, 2024

(54) ARTICLE PROCESSING METHOD, ELECTRONIC DEVICE, AND PROGRAM PRODUCT

(71) Applicant: EMC IP Holding Company LLC, Hopkinton, MA (US)

(72) Inventors: Zijia Wang, WeiFang (CN); Zhen Jia, Shanghai (CN); Jiacheng Ni, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 807 days.

(21) Appl. No.: 17/323,142

(22) Filed: May 18, 2021

(65) Prior Publication Data
US 2022/0343182 A1 Oct. 27, 2022

(30) Foreign Application Priority Data
Apr. 23, 2021 (CN) .......................... 202110443094.X (51) Int. Cl.
*G06N 5/022* (2023.01)
*G06F 16/901* (2019.01)
(Continued)

(52) U.S. Cl.
CPC ......... *G06N 5/022* (2013.01); *G06F 16/9024* (2019.01); *G06F 16/90328* (2019.01); *G06F 18/2413* (2023.01)

(58) Field of Classification Search
CPC ....................................................... G06N 5/022
(Continued)

(56) References Cited

U.S. PATENT DOCUMENTS

2015/0324464 A1* 11/2015 Fan .................... G06F 16/29 707/737
2017/0140052 A1* 5/2017 Bufe, III ............. G06F 16/9024
(Continued)

OTHER PUBLICATIONS

F. Pascual, "Introduction to Topic Modeling," https://monkeylearn.com/blog/introduction-to-topic-modeling/, Sep. 26, 2019, 39 pages.
(Continued)

*Primary Examiner* — Reza Nabi
(74) *Attorney, Agent, or Firm* — Ryan, Mason & Lewis, LLP (57) ABSTRACT

Embodiments of the present disclosure relate to an article processing method, electronic device, and computer program product. The method includes: determining, based on content of a target article, a target article vector associated with the target article; acquiring a reference article vector set associated with a reference article set; and determining, based on a distance in an article vector space between the target article vector and a reference article vector in the reference article vector set, a reference article vector associated with the target article vector in the reference article vector set as an association article vector. By using the technical solution of the present disclosure, an association article associated with a target article can be accurately provided based on the target article selected by a user, so that reports on the target article and its association articles can be further provided to the user for analysis and selection.

20 Claims, 7 Drawing Sheets

(51) Int. Cl.
  *G06F 16/9032* (2019.01)
  *G06F 18/2413* (2023.01)
(58) Field of Classification Search
  USPC .......................................................... 706/46
  See application file for complete search history.

(56) References Cited

U.S. PATENT DOCUMENTS

| | | | | |
|---|---|---|---|---|
| 2018/0077547 | A1* | 3/2018 | Sanchez Barajas | H04W 4/023 |
| 2019/0095537 | A1* | 3/2019 | Zhong | G06F 16/9535 |
| 2020/0159867 | A1* | 5/2020 | Sharma | G06F 16/3347 |
| 2020/0250562 | A1* | 8/2020 | Bly | G06N 5/022 |
| 2021/0342144 | A1* | 11/2021 | Huang | G06F 11/3688 |
| 2022/0101093 | A1* | 3/2022 | Hildebrandt | G06N 3/042 |
| 2022/0300831 | A1* | 9/2022 | Friede | G06N 5/022 |
| 2022/0309254 | A1* | 9/2022 | Kotnis | G06N 5/022 |
| 2022/0343182 | A1* | 10/2022 | Wang | G06F 18/2413 |
| 2023/0132545 | A1* | 5/2023 | Janik | G06N 3/094 706/45 |
| 2023/0136889 | A1* | 5/2023 | Zopf | G06F 40/205 704/9 |
| 2023/0409624 | A1* | 12/2023 | Paula | G06F 40/205 |
| 2023/0409637 | A1* | 12/2023 | Lu | G06F 16/906 |

OTHER PUBLICATIONS

S. Li, "Topice Modeling and Latent Dirichlet Allocation (LDA) in Python," https://towardsdatascience.com/topic-modeling-and-latent-dirichlet-allocation-in-python-9bf156893c24, May 31, 2018, 12 pages.
M. Kelechava, "Using LDA Topic Models as a Classification Model Input," https://towardsdatascience.com/unsupervised-nlp-topic-models-as-a-supervised-learning-input-cf8ee9e5cf28, Mar. 3, 2019, 17 pages.
H. L. Nguyen et al., "Knowledge Graph Fusion for Smart Systems: A Survey," Information Fusion, vol. 61, Mar. 31, 2020, pp. 56-70.
U.S. Appl. No. 17/230,433 filed in the name of Zijia Wang et al. filed Apr. 14, 2021, and entitled "Knowledge Graph Management Based on Multi-Source Data."

* cited by examiner

ARTICLE PROCESSING METHOD, ELECTRONIC DEVICE, AND PROGRAM PRODUCT

RELATED APPLICATION(S)

The present application claims priority to Chinese Patent Application No. 202110443094.X, filed Apr. 23, 2021, and entitled "Article Processing Method, Electronic Device, and Program Product," which is incorporated by reference herein in its entirety.

FIELD

Embodiments of the present disclosure generally relate to computer technologies, and specifically, to an article processing method, electronic device, and computer program product which can be used in the field of data analysis and user preference recommendation.

BACKGROUND

The emergence of various disruptive technologies such as big data, Internet of Things, and artificial intelligence has prompted our society to generate large amounts of data. It is becoming increasingly popular and vital to effectively, efficiently, and transparently capture and integrate, from these large amounts of data, information associated with knowledge. In the process of capturing and integrating information, knowledge graphs may be a good way to achieve goals. In the process of using a knowledge graph, by capturing the aforementioned information in the form of a structure, a report on a current trend and even a future trend prediction can be further provided. However, how to use a knowledge graph and a new article to find an association between the new article and an existing article and how to generate an accurate trend report based on them is still challenging.

In traditional technologies, defects in using a knowledge graph and a new article to find an association between the new article and an existing article and generating an accurate trend report based on them have led to a decrease in user experience of users who aim to acquire the corresponding contents.

SUMMARY

An article processing method, electronic device, and computer program product are provided in embodiments of the present disclosure.

In a first aspect of the present disclosure, an article processing method is provided. The method includes: determining, based on content of a target article, a target article vector associated with the target article, where the target article vector belongs to an article vector space; acquiring a reference article vector set associated with a reference article set, where a reference article vector in the reference article vector set belongs to the article vector space; and determining, based on a distance in the article vector space between the target article vector and the reference article vector in the reference article vector set, a reference article vector associated with the target article vector in the reference article vector set as an association article vector.

In a second aspect of the present disclosure, an electronic device is provided. The electronic device includes: at least one processing unit; and at least one memory coupled to the at least one processing unit and storing instructions for execution by the at least one processing unit, where the instructions, when executed by the at least one processing unit, cause the device to perform actions including: determining, based on content of a target article, a target article vector associated with the target article, where the target article vector belongs to an article vector space; acquiring a reference article vector set associated with a reference article set, where a reference article vector in the reference article vector set belongs to the article vector space; and determining, based on a distance in the article vector space between the target article vector and the reference article vector in the reference article vector set, a reference article vector associated with the target article vector in the reference article vector set as an association article vector.

In a third aspect of the present disclosure, a computer program product is provided. The computer program product is tangibly stored on a non-transitory computer-readable medium and includes machine-executable instructions. The machine-executable instructions, when executed, cause a machine to perform any step of the method described according to the first aspect of the present disclosure.

This Summary is provided to introduce the selection of concepts in a simplified form, which will be further described in the Detailed Description below. The Summary is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent from the following description of example embodiments of the present disclosure, to be viewed in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Hereinafter, illustrative embodiments of the present disclosure will be described in more detail with reference to the accompanying drawings. Although illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

Recognizing the importance of knowledge to human survival, extensive research has focused on defining and designing conceptual models in its representation. Human beings are good at observing, interpreting, and understanding the surrounding environment, while machines need additional knowledge representation to perform all these tasks and behave in an intelligent way. In the early 1700s, people witnessed the rise of modern taxonomy. The taxonomy fully represents a simple hierarchical relationship between concepts and their labels (for example, parent-child relationship). However, it cannot describe any level of attribute restrictions. To overcome this problem, the ontology is an extension of the taxonomy, which can use multiple classes, relationships, and constraints to describe and capture all knowledge in the world as concepts and entities. Therefore, the ontology can effectively record complex structures and patterns in specific fields, and has been widely used in artificial intelligence and machine learning research fields since the 1980s.

A knowledge graph is a main object and method that emphasizes knowledge representation and the essence of semantic data. Knowledge graphs are usually built on existing databases to connect all data in unstructured data such as text, numerals, and geometric figures, and in structured data. A knowledge graph uses a graph model to store data in the form of nodes and edges, where nodes represent entities or primitive values encoded as text, and semantic relationships are represented by edges. The knowledge graph is also somewhat similar to the ontology, but they are not the same. The knowledge graph can acquire information and integrate the information into the ontology, and apply a reasoner to derive new knowledge. In the fourth industrial revolution, this has brought essential and valuable advantages for acquiring basic knowledge from big data. With rapid development of cutting-edge technologies such as the Internet of Things, artificial intelligence, and cloud computing, a large number of different types of data are generated, including but not limited to mass media data, social media data, and sensor data. However, big data itself is difficult to understand and use unless they are processed to extract useful information. Especially supported by knowledge representation of knowledge graphs, associations between different objects from different big data sources can be found, semantic connections are built between these objects, and big data can be effectively transformed into usable knowledge. Therefore, knowledge graphs can help improve the quality, productivity, and adaptability of a decision-making process in a wide range of applications.

Graph deep learning is an emerging field of research, and it is very useful when learning and analyzing graph data. As mentioned above, a graph including a knowledge graph is a data structure that may include nodes including, for example, vertices and edges connecting the nodes together to represent information without a clear beginning or end. All nodes can occupy any position in the space, and they are usually drawn in a two-dimensional or even N-dimensional space, and are usually clustered according to similar features. The edge may be a directed edge represented by an arrow, for example, to indicate a type of a relationship between nodes, so the relationship may be bidirectional or unidirectional. Two different types of graphs include, for example, a directed graph in which a connection direction between nodes is important and an undirected graph in which a connection order makes no difference. A directed graph may actually be unidirectional or bidirectional. Graphics may represent many things, such as social media networks and molecules. Nodes may be regarded as users, products, atoms, and edges may represent connections such as following, purchasing and binding. A social media graph may be embodied as nodes as users, with edges connecting each node and having a set of functions that define it. In terms of social network graphs, edges may be age, gender, country or region of residence, political orientation, etc. Each edge can connect nodes with similar characteristics to show a certain interaction or relationship between nodes. By capturing the information in the knowledge graph, comprehensive results such as reports can be generated.

However, in traditional technologies, taking article processing as an example, defects in using a knowledge graph and a new article to find an association between the new article and an existing article and generating an accurate trend report based on them have led to a decrease in user experience of users who aim to acquire the corresponding contents.

In order to at least partially solve the above problems and one or more of other potential problems, embodiments of the present disclosure provide an article processing method which can be used to generate an accurate trend report by using a knowledge graph to find an association between a new article and existing articles. In an embodiment of the present disclosure, a target article vector associated with a target article as a new article and a reference article vector set associated with a reference article set as existing articles, and optionally an article knowledge graph corresponding to the reference article vector set are used to determine an association article in the reference article set and associated with the target article, and a related report can be further provided.

Figure 1:
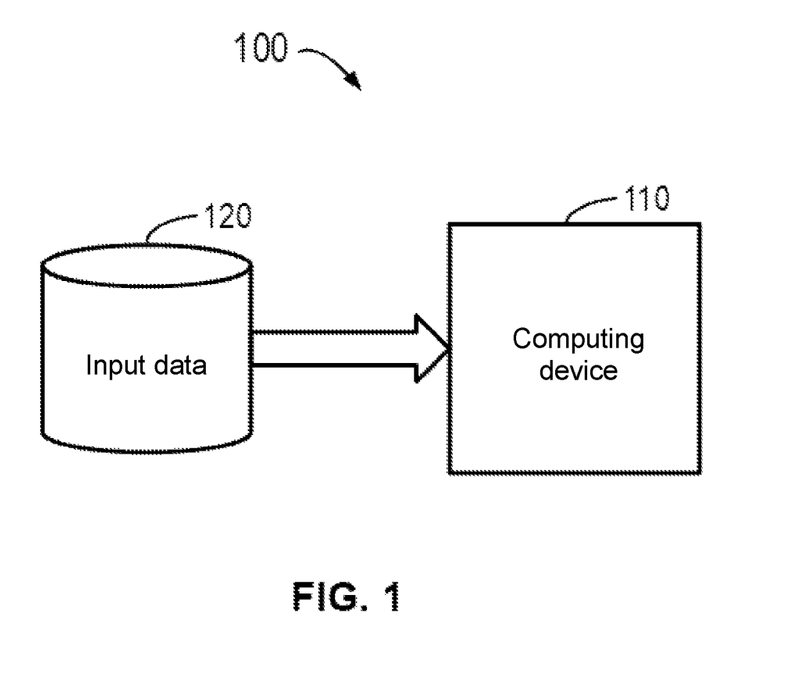
FIG. 1 illustrates a schematic diagram of article processing environment 100 in which a device and/or method according to an embodiment of the present disclosure can be implemented.

FIG. 1 illustrates a schematic block diagram of article processing environment 100 in which an article processing method in some embodiments of the present disclosure can be implemented. According to an embodiment of the present disclosure, article processing environment 100 may be a cloud environment.

As shown in FIG. 1, article processing environment 100 includes computing device 110. In article processing environment 100, input data 120 including, for example, a target article as a new article and a reference article set as existing articles are provided to computing device 110 as an input of computing device 110. According to an embodiment of the present disclosure, input data 120 may further include a target article vector associated with the target article, a reference article vector set associated with the reference article set, an article knowledge graph associated with the reference article vector set, and the like.

After receiving input data 120, computing device 110 may process input data 120. For example, computing device 110 may determine, based on content of a target article included in input data 120, a target article vector associated with the target article, acquire a reference article vector set associated with a reference article set included in input data 120, determine, based on a distance in an article vector space between the target article vector and a reference article vector in the reference article vector set, a reference article vector associated with the target article vector in the reference article vector set as an association article vector, and further determine a reference article associated with the target article in the reference article set.

In article processing environment 100 shown in FIG. 1, providing input data 120 to computing device 110 may be performed through a network. Further, in embodiments of the present disclosure, the description is given by taking computing device 110 as an example, and computing device 110 may include any physical or virtual central processing unit, dedicated processing unit, proprietary accelerator, and the like. However, the protection scope of the present disclosure is not limited thereto, but may be applied to various computing elements, units, modules, or systems that can provide input and output processing capabilities.

It should be understood that article processing environment 100 is only illustrative and not restrictive, and it is extensible or shrinkable. For example, article processing environment 100 may include more computing devices 110, and more input data 120 can be provided to computing device 110 as an input, so as to meet the demands of more users using more computing devices 110 simultaneously for processing more input data 120 simultaneously or non-simultaneously.

The following takes computing device 110 and input data 120 included in FIG. 1 as an example to illustrate article processing method 200, article processing method 300, article processing method 400, article processing method 500, and article processing method 600 shown in FIG. 2 to FIG. 6.

Figure 2:
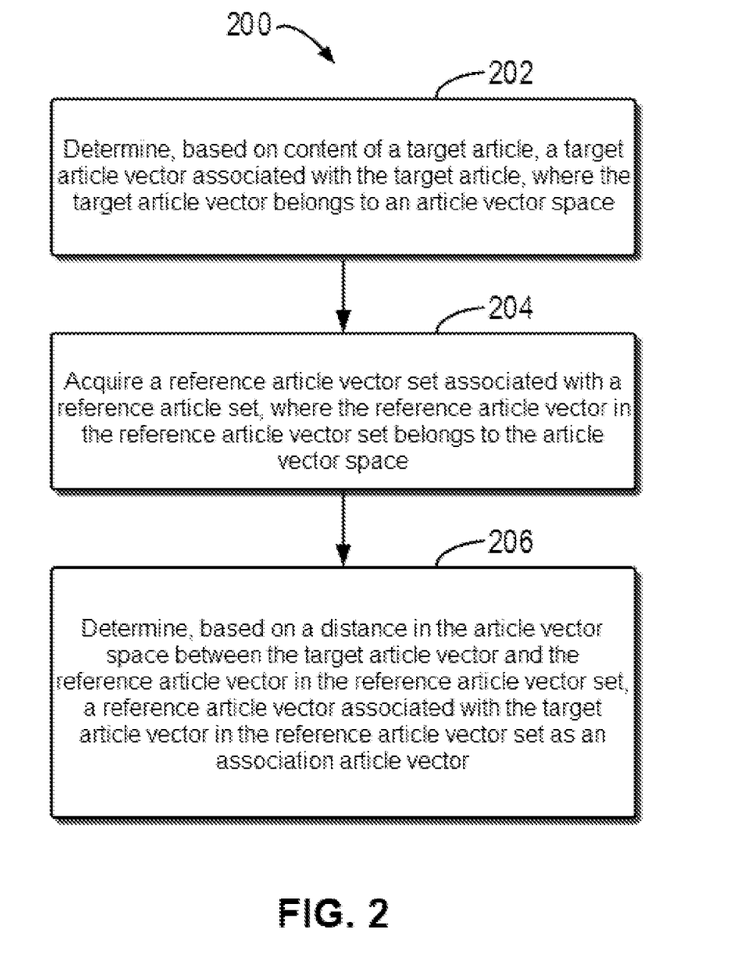
FIG. 2 illustrates a flowchart of article processing method 200 according to an embodiment of the present disclosure.

FIG. 2 illustrates a flowchart of article processing method 200 according to an embodiment of the present disclosure. Method 200 may be implemented by computing device 110 shown in FIG. 1 or by other appropriate devices. It should be understood that article processing method 200 may further include additional steps not shown and/or may omit the shown steps, and the scope of the embodiments of the present disclosure is not limited in this respect.

In block 202, computing device 110 determines a target article vector associated with a target article based on content of the target article included in input data 120. According to an embodiment of the present disclosure, a target article may be an article uploaded by a user to various network platforms or published on these network platforms, including but not limited to a literary work, a technical document, a paper, a blog article, a microblog article, and the like. For example, the target article may be an article uploaded by a user to a certain platform on December 1st of a certain year. The content of the target article includes at least one of the following: a title of the article, an author of the article, an abstract of the article, and a text of the article, and the target article vector belongs to a predefined article vector space.

According to the definition of a vector space, an article vector may refer to a point with fixed coordinates in the article vector space. Therefore, the target article and the target article vector associated with the target article may correspond to a point in the article vector space. Therefore, computing device 110 may use a pre-trained language model to determine the target article vector associated with the target article based on the content of the target article.

In block 204, computing device 110 acquires a reference article vector set associated with a reference article set. According to an embodiment of the present disclosure, the reference article set may include a set of articles uploaded by users to various network platforms or published on these network platforms in a period of time in the past, and the set of articles have been analyzed and counted. For example, the reference article set may be a set of articles that have been uploaded to a certain platform from January to November of a certain year. These articles have been analyzed and counted, and it is possible to know a relationship of these articles such as similarity, advance, or parallelism.

According to an embodiment of the present disclosure, a reference article set used to acquire a reference article vector set may be included in input data 120, and a reference article vector in the reference article vector set also belongs to a predefined article vector space.

As mentioned above, the article vector may refer to a point with fixed coordinates in the article vector space. Therefore, the reference article set and the reference article vector set associated with the reference article set may correspond to a point set in the article vector space.

In block 206, computing device 110 determines, based on a distance in the article vector space between the target article vector and the reference article vector in the reference article vector set, a reference article vector associated with the target article vector in the reference article vector set as an association article vector.

According to an embodiment of the present disclosure, the target article vector acquired in block 202 and the reference article vector set acquired in block 204 correspond to a point and a point set in the same article vector space. At the same time, a position of a point in the article vector space, such as coordinates, is associated with the content of the article. Therefore, a distance between two points in the article vector space can represent an association of two articles corresponding to the two points. Generally speaking, a smaller distance between two points in the article vector space indicates a stronger association between two articles corresponding to the two points. Conversely, a greater distance between two points in the article vector space indicates a weaker association between two articles corresponding to the two points.

Therefore, according to an embodiment of the present disclosure, the distance in the article vector space between the target article vector and the reference article vector in the reference article vector set can be determined first, and a reference article vector whose distance from the target article vector is less than a threshold distance is determined as associated with the target article vector. These reference article vectors may be referred to as association article vectors, and reference articles corresponding to the association article vectors may be considered as associated with the target article.

As can be seen, by using method 200, the article vector space to which the target article and the reference article set belong can be used to determine an association article in the reference article set that is associated with the target article.

After the association article or association article vector associated with the target article is determined, further processing can be performed based on the association article or association article vector, so an article report associated with the target article can be provided for the user who uploads or publishes the target article or reads the target article.

Figure 3:
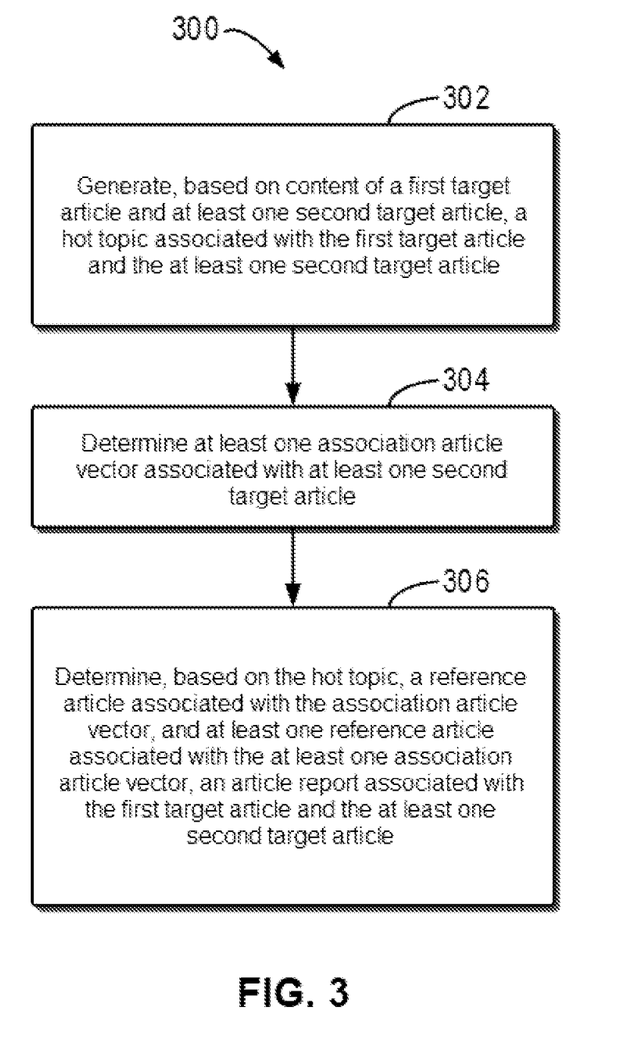
FIG. 3 illustrates a flowchart of article processing method 300 according to an embodiment of the present disclosure.

FIG. 3 illustrates a flowchart of article processing method 300 according to an embodiment of the present disclosure.

Method 300 may be implemented by computing device 110 shown in FIG. 1 or by other appropriate devices. It should be understood that article processing method 300 is an extension of article processing method 200, and can also include additional steps not shown and/or may omit the shown steps, and the scope of the embodiments of the present disclosure is not limited in this respect.

In block 302, computing device 110 generates, based on content of a first target article and at least one second target article, a hot topic associated with the first target article and the at least one second target article. According to an embodiment of the present disclosure, a second target article may be included in input data 120 and thus provided to computing device 110, and the second target article may also be an article uploaded by a user to various network platforms or published in these network platforms. For example, the first target article and the second target article may be articles uploaded by multiple users to a certain platform on December of a certain year but are not analyzed and counted.

According to an embodiment of the present disclosure, computing device 110 may use a data counting method, for example, a pre-trained counting model to generate, based on content of the first target article and at least one second target article, a hot topic associated with the first target article and the at least one second target article. For example, the hot topic may include a result of a sports game, a major epidemic situation, and other common events.

In block 304, computing device 110 determines at least one association article vector associated with the at least one second target article. According to an embodiment of the present disclosure, when the at least one second target article includes multiple second target articles, each determined association article vector may be associated with one second target article or simultaneously with multiple second target articles.

According to an embodiment of the present disclosure, computing device 110 may use a pre-trained language model to determine at least one association article vector associated with the at least one second target article based on the content of the at least one second target article.

In block 306, computing device 110 determines, based on the hot topic, a reference article associated with the association article vector, and at least one reference article associated with the at least one association article vector, an article report associated with the first target article and the at least one second target article. According to an embodiment of the present disclosure, the article report may include, for example, the hot topic generated in block 302, the titles or contents of the first target article and the at least one second target article, the titles or contents of the related aforementioned reference article and at least one reference article, or links to these contents.

As can be seen, by using the method 300, multiple target articles are used to generate a hot topic, and the hot topic and multiple reference articles associated with the multiple target articles can be used to generate the article report, so an article report associated with the target article can be provided for the user who uploads or publishes the target article or reads the target article, so that the user can understand various information associated with the target article.

According to an embodiment of the present disclosure, a knowledge graph associated with the association article or the association article vector can be provided, so that the user can more intuitively understand the relationship between the target article and the association article, and can perform a further operation based on the knowledge graph associated with the association article or the association article vector.

Figure 4:
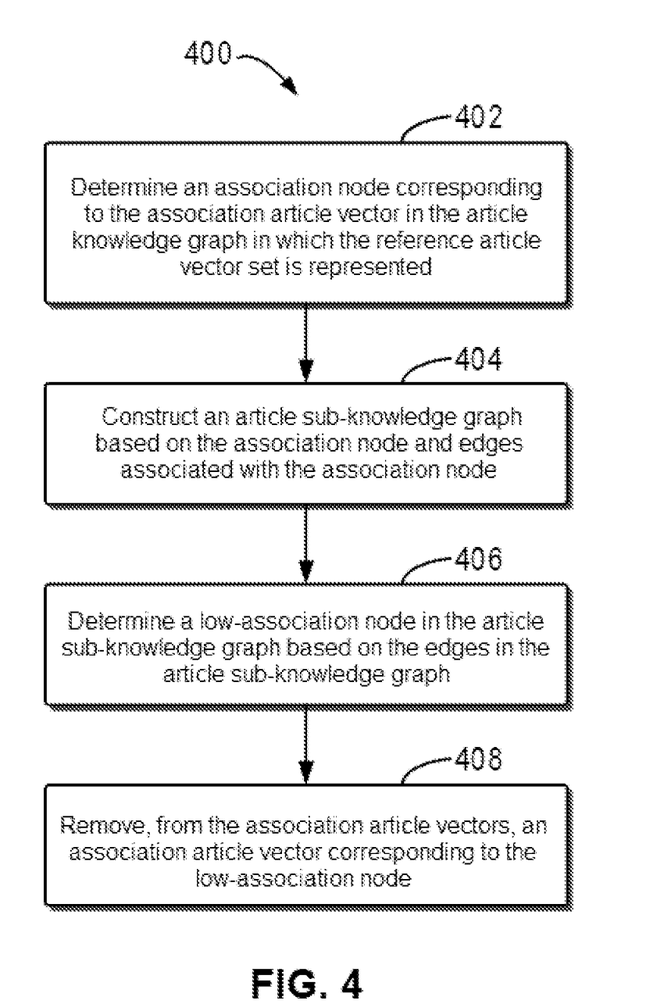
FIG. 4 illustrates a flowchart of article processing method 400 according to an embodiment of the present disclosure.

FIG. 4 illustrates a flowchart of article processing method 400 according to an embodiment of the present disclosure. Method 400 may be implemented by computing device 110 shown in FIG. 1 or by other appropriate devices. It should be understood that article processing method 400 is an extension of article processing method 200, and can also include additional steps not shown and/or may omit the shown steps, and the scope of the embodiments of the present disclosure is not limited in this respect.

In block 402, computing device 110 determines an association node corresponding to the association article vector in the article knowledge graph in which the reference article vector set is represented. According to an embodiment of the present disclosure, the reference article vector set may be represented as an article knowledge graph, nodes of the article knowledge graph correspond to reference article vectors in the reference article vector set, and an edge between two nodes in the article knowledge graph represents an article vector association between reference article vectors corresponding to the two nodes, and the article knowledge graph may be included in input data 120 so as to be acquired by computing device 110.

According to an embodiment of the present disclosure, because the reference vector in the reference article vector set has a correspondence with the node in the article knowledge graph, computing device 110 may directly determine an association node corresponding to the association article vector in the article knowledge graph by using the determined association article vector.

In block 404, computing device 110 constructs an article sub-knowledge graph based on the association node and edges associated with the association node. According to an embodiment of the present disclosure, nodes in the article knowledge graph are connected by edges. Therefore, after computing device 110 determines the association nodes in the article knowledge graph, edges associated with these association nodes can be directly determined. In an exemplary embodiment, an edge connected to only one of the association nodes will not be considered as an edge related to the association node, because such an edge cannot reflect the association between the association nodes. According to an embodiment of the present disclosure, the article sub-knowledge graph is a part of the article knowledge graph.

According to an embodiment of the present disclosure, after the operation in block 404 is performed by computing device 110, the article sub-knowledge graph associated with the association article or the association article vector may be generated. The user can intuitively understand a relationship between the target article and the association article by using the article sub-knowledge graph.

In block 406, computing device 110 determines a low-association node in the article sub-knowledge graph based on the edges in the article sub-knowledge graph. According to an embodiment of the present disclosure, the edges in the article sub-knowledge graph are used to represent the association between nodes in the article sub-knowledge graph. Therefore, the low-association node in the article sub-knowledge graph can be determined by analyzing the edges.

According to some embodiments of the present disclosure, computing device 110 may determine the number of edges between a certain node and other nodes in the article sub-knowledge graph, and if this number is less than a threshold number, determine the node as a low-association node. Because a small number of edges between the node and other nodes indicates that this node has a weaker association to the entire article sub-knowledge graph, and it may be because it is only associated with, for example, one other node, which makes the node have an association with the entire article sub-knowledge graph.

According to other embodiments of the present disclosure, computing device 110 may determine if lengths of edges between a certain node and other nodes in the article sub-knowledge graph are all greater than a threshold length, and if the lengths of the aforementioned edges are all greater than the threshold length, the node is determined to be a low-association node. This is because the length of the edge between nodes in the article sub-knowledge graph can represent the association between the nodes connected by the edge.

In block 408, computing device 110 removes, from the association article vectors, an association article vector corresponding to the low-association node. According to an embodiment of the present disclosure, after computing device 110 removes the association article vector corresponding to the low-association node from the association article vectors, the remaining association article vectors are more closely associated with the target article vector, and therefore, the association articles corresponding to the remaining association article vectors are also more closely associated with the target article, thereby making it possible to provide the user with more closely associated association articles.

According to some embodiments of the present disclosure, as an alternative to block 408, or after block 408, computing device 110 may remove the low-association node and edges connected to the low-relevancy node from the article sub-knowledge graph. At this time, the association between the reference article set corresponding to the updated article sub-knowledge graph and the target article or target article vector is stronger.

Figure 5:
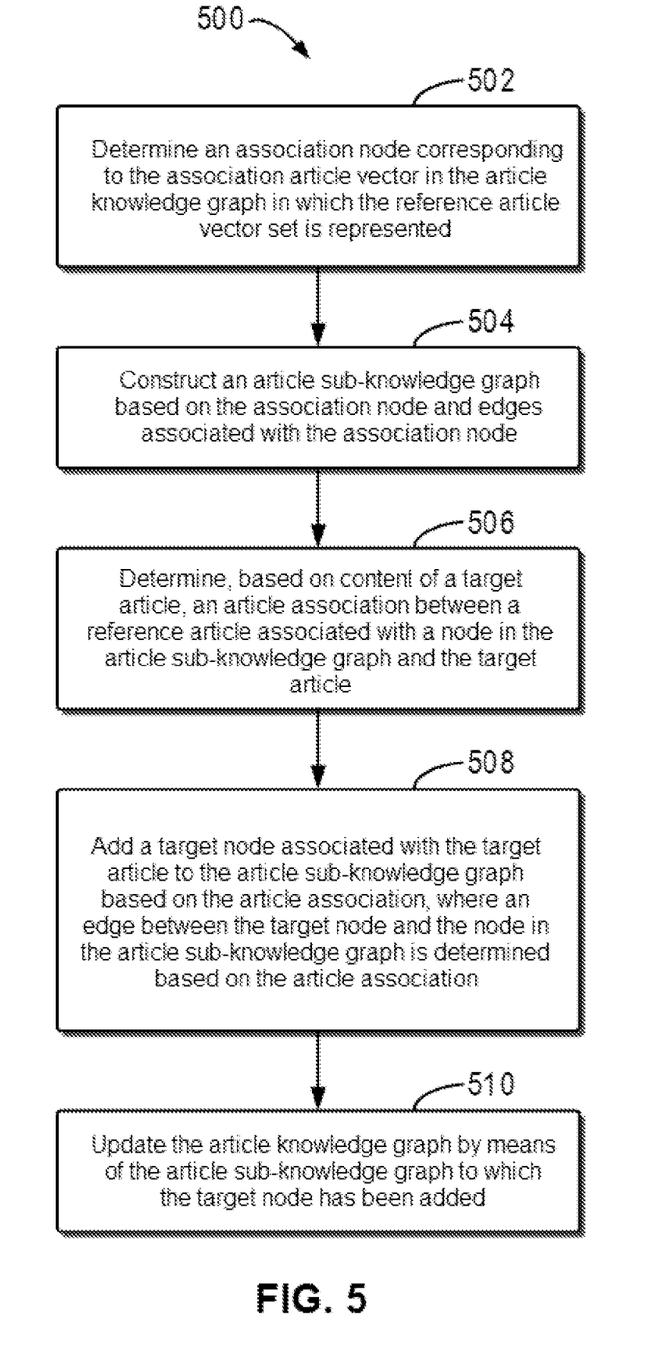
FIG. 5 illustrates a flowchart of article processing method 500 according to an embodiment of the present disclosure.

FIG. 5 illustrates a flowchart of article processing method 500 according to an embodiment of the present disclosure. Method 500 may be implemented by computing device 110 shown in FIG. 1 or by other appropriate devices. It should be understood that article processing method 500 is an extension of article processing method 200, and can also include additional steps not shown and/or may omit the shown steps, and the scope of the embodiments of the present disclosure is not limited in this respect.

In block 502, computing device 110 determines an association node corresponding to the association article vector in the article knowledge graph in which the reference article vector set is represented. The specific content of an action involved in block 502 is the same as that involved in block 402, and will not be repeated here.

In block 504, computing device 110 constructs an article sub-knowledge graph based on the association node and edges associated with the association node. The specific content of steps involved in block 504 is the same as that involved in block 404, and will not be repeated here.

In block 506, computing device 110 determines, based on content of a target article, an article association between a reference article associated with a node in the article sub-knowledge graph and the target article. According to an embodiment of the present disclosure, computing device 110 may adopt a data comparison method, for example, a pre-trained comparison model to determine an article association of a reference article associated with a node in the article sub-knowledge graph and the target article based on the content of the target article. The method of determining the association of articles may include, for example, determining a proportion or degree of identical or similar parts between articles, or may include determining a degree of identity or similarity between semantics of articles, for example.

In block 508, computing device 110 adds a target node associated with the target article to the article sub-knowledge graph based on the article association determined in block 506. According to an embodiment of the present disclosure, the edge between the target node and the node in the article sub-knowledge graph is determined based on the article association. As mentioned above, the edge between the nodes of the article sub-knowledge graph may be used to represent an association between the nodes and an association between articles corresponding to the nodes. Therefore, the association between the articles can be used to determine if there is an edge between the nodes, the length of the edge, and positions of the nodes in the article sub-knowledge graph. Then, the determined target node can be added to the article sub-knowledge graph, and the edge between the target node and the association node can be added to the article sub-knowledge graph to which the target node is added, thereby forming an updated article sub-knowledge graph. By using the updated article sub-knowledge graph, a relationship between the target node and another node can be intuitively seen, and a relationship between the target article and the association article can be intuitively seen.

In block 510, computing device 110 updates the article knowledge graph by using the article sub-knowledge graph to which the target node has been added. According to an embodiment of the present disclosure, since the article sub-knowledge graph is a part of the article knowledge graph, and the association nodes in the article sub-knowledge graph are nodes that are associated with the target node in the article knowledge graph, after the target node is added to the article sub-knowledge graph, the article knowledge graph can be easily updated, so that the updated article knowledge graph also includes the target node. At this time, there are only edges between the target node in the updated article knowledge graph and the association nodes that constitute the article sub-knowledge graph.

According to an embodiment of the present disclosure, update of the article knowledge graph is completed at this time, and the updated article knowledge graph can be used for a subsequent target article to determine an association node associated with the subsequent target article, a reference article vector associated with the target article vector, and a reference article associated with the target article vector.

According to an embodiment of the present disclosure, the target article as input data 120 may be multiple target articles. In this case, multiple target articles may be used to determine a hot topic for generating a report associated with the target article.

Figure 6:
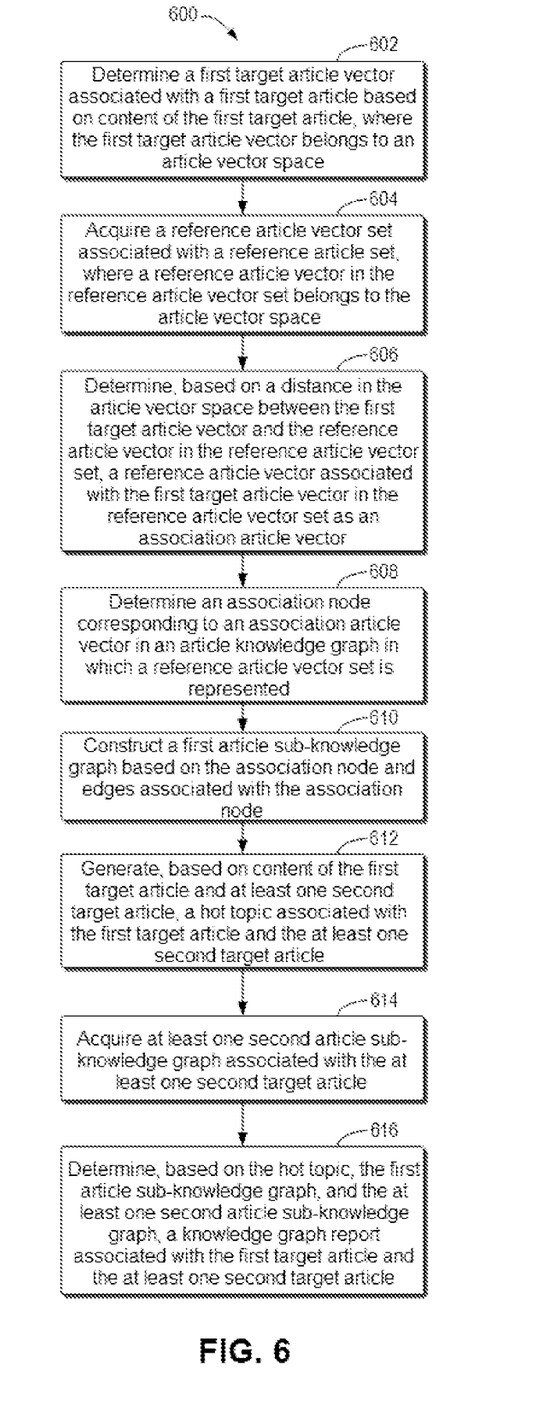
FIG. 6 illustrates a flowchart of article processing method 600 according to an embodiment of the present disclosure.

FIG. 6 illustrates a flowchart of article processing method 600 according to an embodiment of the present disclosure. Method 600 may be implemented by computing device 110 shown in FIG. 1 or by other appropriate devices. It should be understood that article processing method 600 may further include additional steps not shown and/or may omit the shown steps, and the scope of the embodiments of the present disclosure is not limited in this respect.

In block 602, computing device 110 determines a first target article vector associated with a first target article based on content of the first target article included in input data 120. According to an embodiment of the present disclosure, the first target article may be an article uploaded to or published on various network platforms by a user, and the first target article vector belongs to a predefined article vector space. The specific content of the step involved in block 602 is the same as that involved in block 202, and will not be repeated here.

In block 604, computing device 110 acquires a reference article vector set associated with a reference article set. The specific content of the step involved in block 604 is the same as that involved in block 202, and will not be repeated here.

In block 606, computing device 110 determines, based on a distance in an article vector space between the first target article vector and a reference article vector in the reference article vector set, a reference article vector associated with the first target article vector in the reference article vector set as an association article vector. The specific content of the step involved in block 606 is the same as that involved in block 206, and will not be repeated here.

In block 608, computing device 110 determines an association node corresponding to the association article vector in the article knowledge graph in which the reference article vector set is represented. The specific content of this action involved in block 608 is the same as that involved in block 402, and will not be repeated here.

In block 610, computing device 110 constructs a first article sub-knowledge graph based on the association node and the edges associated with the association node. The specific content of the step involved in block 608 is the same as that involved in block 402, and will not be repeated here.

In block 612, computing device 110 generates, based on content of a first target article and at least one second target article, a hot topic associated with the first target article and the at least one second target article. The specific content of the step involved in block 612 is the same as that involved in block 302, and will not be repeated here.

In block 614, computing device 110 acquires at least one second article sub-knowledge graph associated with the at least one second target article. According to an embodiment of the present disclosure, the specific content of the step involved in block 614 is similar to the specific content of the steps involved in blocks 402 and 404, and the difference is multiple second article sub-knowledge graphs that may be acquired when there are multiple second target articles with low or no association. For example, if a first second target article is associated with football, and a second target article is associated with quantum mechanics, it is likely that association articles or association article vectors determined for the two second target articles almost have no association. At this time, it is possible to acquire two second article sub-knowledge graphs, and the aforementioned two second target articles are respectively associated with one of the two second article sub-knowledge graphs. For another example, if two second target articles are both associated with basketball, it is likely that only one second article sub-knowledge graph will be acquired.

In block 616, computing device 110 determines, based on a hot topic, a first article sub-knowledge graph, and at least one second article sub-knowledge graph, a knowledge graph report associated with the first target article and the at least one second target article. According to an embodiment of the present disclosure, the knowledge graph report may include, for example, the hot topic generated in block 612, the titles or contents of the first target article and the at least one second target article, the titles or contents of the associated aforementioned reference article and at least one reference article, the first article sub-knowledge graph and the at least one second article sub-knowledge graph, or links to these contents.

As can be seen, by using the method 600, multiple target articles are used to generate a hot topic, and the hot topic, multiple reference articles associated with the multiple target articles, and multiple sub-knowledge graphs associated with the multiple target articles can be used to generate a knowledge graph report, so a knowledge graph report associated with the target article can be provided for the user who uploads or publishes the target article or reads the target article, so that the user can understand various information associated with the target article.

Figure 7:
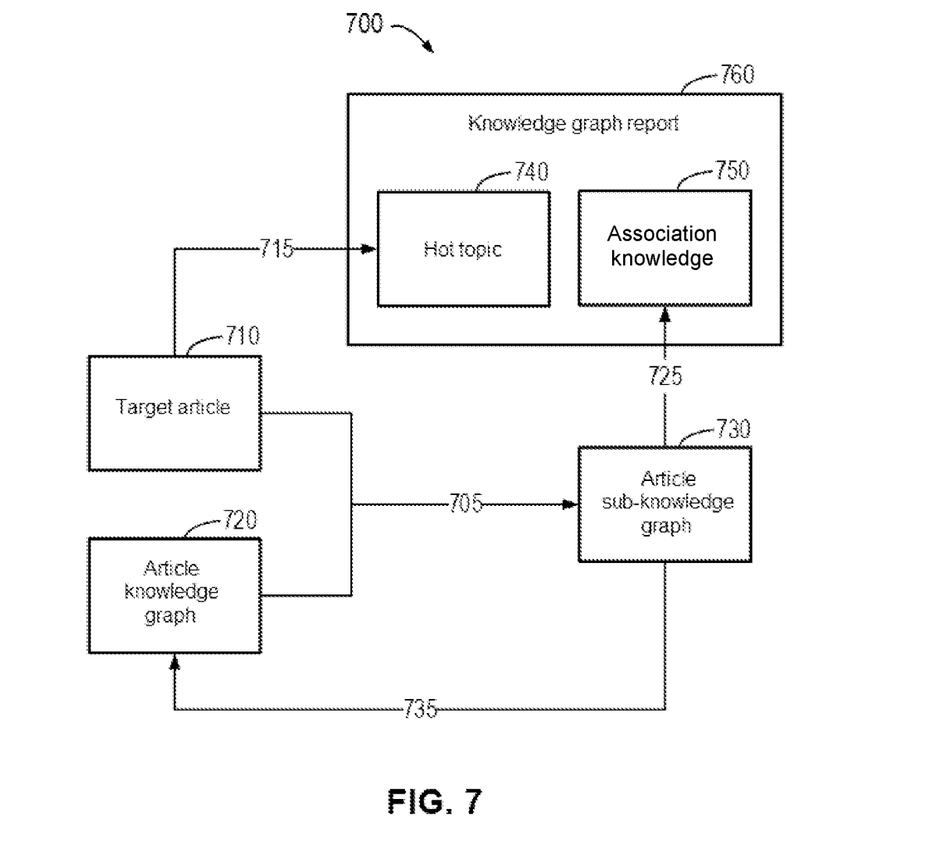
FIG. 7 illustrates a schematic diagram of article processing flow 700 according to an embodiment of the present disclosure.

FIG. 7 shows a schematic diagram of article processing flow 700 according to an embodiment of the present disclosure. As shown in FIG. 7, article knowledge graph 720 in which target article 710 and a reference article vector set are represented is directed to article sub-knowledge graph 730 by using arrow 705 indicating "generation," thereby indicating that target article 710 and article knowledge graph 720 can be used to generate article sub-knowledge graph 730.

Target article 710 is directed to hot topic 740 by using arrow 715 indicating "generation," thereby indicating that hot topic 740 can be generated by using target article 710.

Article sub-knowledge graph 730 is directed to association knowledge 750 by using arrow 725 indicating "generation," thereby indicating that association knowledge 750 can be generated by using article sub-knowledge graph 730. According to an embodiment of the present disclosure, association knowledge may be article sub-knowledge graph 730 itself or a part thereof, or a link to the article sub-knowledge graph, or association knowledge acquired by using article sub-knowledge graph 730, such as enumeration and classification of nodes and edges.

Hot topic 740 and association knowledge 750 are included in knowledge graph report 760, thereby indicating that knowledge graph report 760 may include hot topic 740 and association knowledge 750, or may be generated by using hot topic 740 and association knowledge 750.

Article sub-knowledge graph 730 is directed to article knowledge graph 720 by using arrow 735 indicating "update," thereby indicating that article knowledge graph 720 can be updated by using article sub-knowledge graph 730.

Features and other aspects of article processing environment 100 in which devices and/or methods according to embodiments of the present disclosure can be implemented, article processing method 200 according to embodiments of the present disclosure, article processing method 300 according to embodiments of the present disclosure, article processing method 400 according to embodiments of the present disclosure, article processing method 500 according to embodiments of the present disclosure, article processing method 600 according to embodiments of the present disclosure, and article processing flow 700 according to embodiments of the present disclosure are described above with reference to FIG. 1 to FIG. 7. It should be understood that the above description is to better demonstrate features and other aspects of the embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes can be arbitrarily set as needed without affecting the normal implementation of the embodiments of the present disclosure.

By using the above description with reference to FIG. 1 to FIG. 7, an article processing solution is provided according to the technical solutions of the embodiments of the present disclosure, which can be used to use a knowledge graph to find an association between a new article and existing articles and generate an accurate trend report based on them. In an embodiment of the present disclosure, a target article vector associated with a target article as a new article and a reference article vector set associated with a reference article set as existing articles, and optionally an article knowledge graph corresponding to the reference article vector set are used to determine an association article in the reference article set and associated with the target article, and a related report can be further provided. Specifically, the technical solutions according to the embodiments of the present disclosure have many advantages over conventional solutions.

For example, by using the technical solution of the present disclosure, by using an article vector space or optionally an article knowledge graph, association articles associated with the target article can be accurately provided based on the target article selected by a user, so that a report on the target article and its association articles can be further provided to the user for analysis and selection by the user, which can improve user experience of a user who aims to acquire the corresponding contents by providing the user with accurate association articles or information. In addition, when the aforementioned report is provided, since an article sub-knowledge graph can be used, users can more intuitively understand a relationship between a target article and an association article, thereby further improving user experience.

Figure 8:
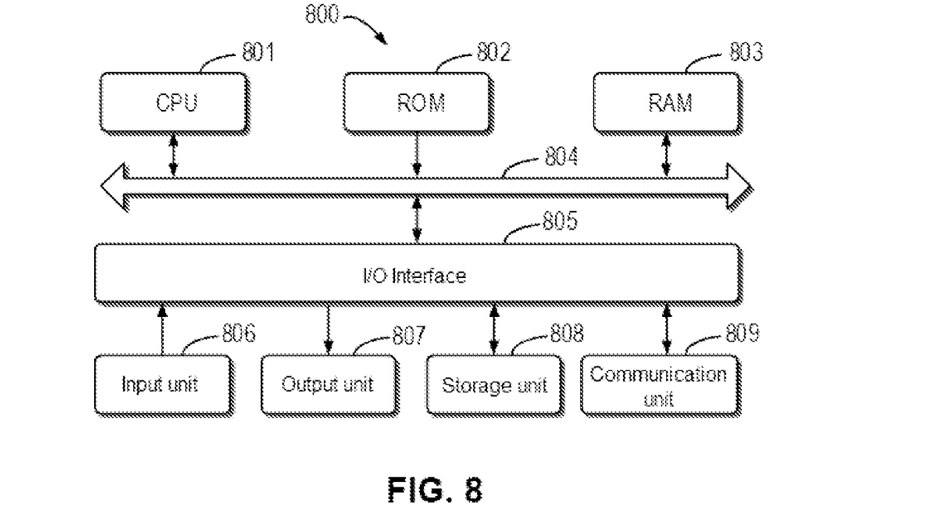
FIG. 8 illustrates a schematic block diagram of example device 800 that can be used to implement an embodiment of the present disclosure.

FIG. 8 illustrates a schematic block diagram of example device 800 that can be used to implement embodiments of the present disclosure. According to embodiments of the present disclosure, computing device 110 in FIG. 1 may be implemented by device 800. As shown in the figure, device 800 includes central processing unit (CPU) 801, which may execute various appropriate actions and processing in accordance with computer program instructions stored in read-only memory (ROM) 802 or computer program instructions loaded from storage unit 808 onto random access memory (RAM) 803. In RAM 803, various programs and data required for the operation of device 800 may also be stored. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The various processes and processing described above, such as methods 200, 300, 400, 500, and 600 may be performed by CPU 801. For example, in some embodiments, methods 200, 300, 400, 500, and 600 may be implemented as a computer software program that is tangibly included in a machine-readable medium such as storage unit 808. In some embodiments, part or all of the computer program may be loaded and/or installed onto device 800 via ROM 802 and/or communication unit 809. One or more actions of methods 200, 300, 400, 500, and 600 described above may be performed when the computer program is loaded into RAM 803 and executed by CPU 801.

The embodiments of the present disclosure may relate to a method, a device, a system, and/or a computer program product. The computer program product may include a computer-readable storage medium on which computer-readable program instructions for performing various aspects of the embodiments of the present disclosure are carried.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the embodiments of the present disclosure may be assembly instructions, instruction set architecture (ISA) instructions, machine instructions, machine-related instructions, microcode, firmware instructions, state setting data, or source code or object code written in any combination of one or more programming languages, where the programming languages include object-oriented programming languages, such as Smalltalk and C++, and conventional procedural programming languages, such as the "C" language or similar programming languages. The computer-readable program instructions "may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user's computer over any kind of networks, including a local area network (LAN) or a wide area network (WAN), or may be connected to an external computer, for example, connected through the Internet by using an Internet service provider. In some embodiments, an electronic circuit, for example, a programmable logic circuit, a field programmable gate array (FPGA), or a programmable logic array (PLA), is personalized by utilizing state information of the computer-readable program instructions, where the electronic circuit may execute computer-readable program instructions so as to implement various aspects of the embodiments of the present disclosure.

Various aspects of the embodiments of the present disclosure are described here with reference to the flowcharts and/or block diagrams of the methods, the devices/systems, and the computer program products according to the embodiments of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, and to otherwise enable other persons of ordinary skill in the art to understand the embodiments disclosed here.

What is claimed is:

1. An article processing method, comprising:
   determining, based on content of a target article, a target article vector associated with the target article, wherein the target article vector belongs to an article vector space;
   acquiring a reference article vector set associated with a reference article set, wherein a reference article vector in the reference article vector set belongs to the article vector space; and
   determining, based on a distance in the article vector space between the target article vector and the reference article vector in the reference article vector set, a reference article vector associated with the target article vector in the reference article vector set as an association article vector;
   wherein the reference article vector set is represented as an article knowledge graph, nodes of the article knowledge graph correspond to reference article vectors in the reference article vector set, and an edge between two nodes in the article knowledge graph represents an article vector association between the reference article vectors corresponding to the two nodes; and
   wherein the method further comprises:
   determining an association node corresponding to the association article vector in the article knowledge graph; and
   constructing an article sub-knowledge graph based on the association node and edges associated with the association node.

2. The method according to claim 1, further comprising:
   determining a low-association node in the article sub-knowledge graph based on the edges in the article sub-knowledge graph; and
   removing, from the association article vector, an association article vector corresponding to the low-association node.

3. The method according to claim 2, wherein determining the low-association node comprises determining at least one of the following:
   determining, if the number of edges between a first node and other nodes in the article sub-knowledge graph is less than a threshold number, the first node as the low-association node; and
   determining, if lengths of edges between the first node and other nodes in the article sub-knowledge graph are all greater than a threshold length, the first node as the low-association node.

4. The method according to claim 1, further comprising:
   determining, based on content of the target article, article association between a reference article associated with a node in the article sub-knowledge graph and the target article;
   adding a target node associated with the target article to the article sub-knowledge graph based on the article association, wherein an edge between the target node and the node in the article sub-knowledge graph is determined based on the article association; and updating the article knowledge graph by using the article sub-knowledge graph to which the target node has been added.

5. The method according to claim 1, wherein the target article is a first target article, the article sub-knowledge graph is a first article sub-knowledge graph, and the method further comprises:

generating, based on content of the first target article and at least one second target article, a hot topic associated with the first target article and the at least one second target article;

acquiring at least one second article sub-knowledge graph associated with the at least one second target article; and determining, based on the hot topic, the first article sub-knowledge graph, and the at least one second article sub-knowledge graph, a knowledge graph report associated with the first target article and the at least one second target article.

6. The method according to claim 1, wherein the target article is a first target article, and the method further comprises:

generating, based on content of the first target article and at least one second target article, a hot topic associated with the first target article and the at least one second target article;

determining at least one association article vector associated with the at least one second target article; and determining, based on the hot topic, a reference article associated with the association article vector, and at least one reference article associated with the at least one association article vector, an article report associated with the first target article and the at least one second target article.

7. The method according to claim 1, wherein the content of the target article comprises at least one of the following:
   a title of the article;
   an author of the article;
   an abstract of the article; and
   a text of the article.

8. An electronic device, comprising:
   at least one processing unit; and
   at least one memory coupled to the at least one processing unit and storing instructions for execution by the at least one processing unit, wherein the instructions, when executed by the at least one processing unit, cause the device to perform actions comprising:
   determining, based on content of a target article, a target article vector associated with the target article, wherein the target article vector belongs to an article vector space;
   acquiring a reference article vector set associated with a reference article set, wherein a reference article vector in the reference article vector set belongs to the article vector space; and
   determining, based on a distance in the article vector space between the target article vector and the reference article vector in the reference article vector set, a reference article vector associated with the target article vector in the reference article vector set as an association article vector;
   wherein the reference article vector set is represented as an article knowledge graph, nodes of the article knowledge graph correspond to reference article vectors in the reference article vector set, and an edge between two nodes in the article knowledge graph represents an article vector association between the reference article vectors corresponding to the two nodes; and
   wherein the actions further comprise:
   determining an association node corresponding to the association article vector in the article knowledge graph; and
   constructing an article sub-knowledge graph based on the association node and edges associated with the association node.

9. The electronic device according to claim 8, wherein the actions further comprise:
   determining a low-association node in the article sub-knowledge graph based on the edges in the article sub-knowledge graph; and
   removing, from the association article vector, an association article vector corresponding to the low-association node.

10. The electronic device according to claim 9, wherein determining the low-association node comprises determining at least one of the following:
    determining, if the number of edges between a first node and other nodes in the article sub-knowledge graph is less than a threshold number, the first node as the low-association node; and
    determining, if lengths of edges between the first node and other nodes in the article sub-knowledge graph are all greater than a threshold length, the first node as the low-association node.

11. The electronic device according to claim 8, wherein the actions further comprise:
    determining, based on content of the target article, article association between a reference article associated with a node in the article sub-knowledge graph and the target article;
    adding a target node associated with the target article to the article sub-knowledge graph based on the article association, wherein an edge between the target node and the node in the article sub-knowledge graph is determined based on the article association; and
    updating the article knowledge graph by using the article sub-knowledge graph to which the target node has been added.

12. The electronic device according to claim 8, wherein the target article is a first target article, the article sub-knowledge graph is a first article sub-knowledge graph, and the actions further comprise:
    generating, based on content of the first target article and at least one second target article, a hot topic associated with the first target article and the at least one second target article;
    acquiring at least one second article sub-knowledge graph associated with the at least one second target article; and
    determining, based on the hot topic, the first article sub-knowledge graph, and the at least one second article sub-knowledge graph, a knowledge graph report associated with the first target article and the at least one second target article.

13. The electronic device according to claim 8, wherein the target article is a first target article, and the actions further comprise:
    generating, based on content of the first target article and at least one second target article, a hot topic associated with the first target article and the at least one second target article;

determining at least one association article vector associated with the at least one second target article; and determining, based on the hot topic, a reference article associated with the association article vector, and at least one reference article associated with the at least one association article vector, an article report associated with the first target article and the at least one second target article.

14. The electronic device according to claim 8, wherein the content of the target article comprises at least one of the following:
   a title of the article;
   an author of the article;
   an abstract of the article; and
   a text of the article.

15. A computer program product, tangibly stored in a non-transitory computer-readable medium and comprising machine-executable instructions, wherein the machine-executable instructions, when executed, cause a machine to perform steps of an article processing method, the method comprising:
   determining, based on content of a target article, a target article vector associated with the target article, wherein the target article vector belongs to an article vector space;
   acquiring a reference article vector set associated with a reference article set, wherein a reference article vector in the reference article vector set belongs to the article vector space; and
   determining, based on a distance in the article vector space between the target article vector and the reference article vector in the reference article vector set, a reference article vector associated with the target article vector in the reference article vector set as an association article vector;
   wherein the reference article vector set is represented as an article knowledge graph, nodes of the article knowledge graph correspond to reference article vectors in the reference article vector set, and an edge between two nodes in the article knowledge graph represents an article vector association between the reference article vectors corresponding to the two nodes; and
   wherein the method further comprises:
   determining an association node corresponding to the association article vector in the article knowledge graph; and
   constructing an article sub-knowledge graph based on the association node and edges associated with the association node.

16. The computer program product according to claim 15, wherein the method further comprises:
   determining a low-association node in the article sub-knowledge graph based on the edges in the article sub-knowledge graph; and
   removing, from the association article vector, an association article vector corresponding to the low-association node.

17. The computer program product according to claim 16, wherein determining the low-association node comprises determining at least one of the following:
   determining, if the number of edges between a first node and other nodes in the article sub-knowledge graph is less than a threshold number, the first node as the low-association node; and
   determining, if lengths of edges between the first node and other nodes in the article sub-knowledge graph are all greater than a threshold length, the first node as the low-association node.

18. The computer program product according to claim 15, wherein the method further comprises:
   determining, based on content of the target article, article association between a reference article associated with a node in the article sub-knowledge graph and the target article;
   adding a target node associated with the target article to the article sub-knowledge graph based on the article association, wherein an edge between the target node and the node in the article sub-knowledge graph is determined based on the article association; and
   updating the article knowledge graph by using the article sub-knowledge graph to which the target node has been added.

19. The computer program product according to claim 15, wherein the target article is a first target article, the article sub-knowledge graph is a first article sub-knowledge graph, and the method further comprises:
   generating, based on content of the first target article and at least one second target article, a hot topic associated with the first target article and the at least one second target article;
   acquiring at least one second article sub-knowledge graph associated with the at least one second target article; and
   determining, based on the hot topic, the first article sub-knowledge graph, and the at least one second article sub-knowledge graph, a knowledge graph report associated with the first target article and the at least one second target article.

20. The computer program product according to claim 15, wherein the target article is a first target article, and the method further comprises:
   generating, based on content of the first target article and at least one second target article, a hot topic associated with the first target article and the at least one second target article;
   determining at least one association article vector associated with the at least one second target article; and
   determining, based on the hot topic, a reference article associated with the association article vector, and at least one reference article associated with the at least one association article vector, an article report associated with the first target article and the at least one second target article.

* * * * *